Dec. 5, 1933.                H. G. NAYLOR                1,937,774
                        AIR HEATING APPARATUS
                Original Filed May 1, 1931    2 Sheets-Sheet 1
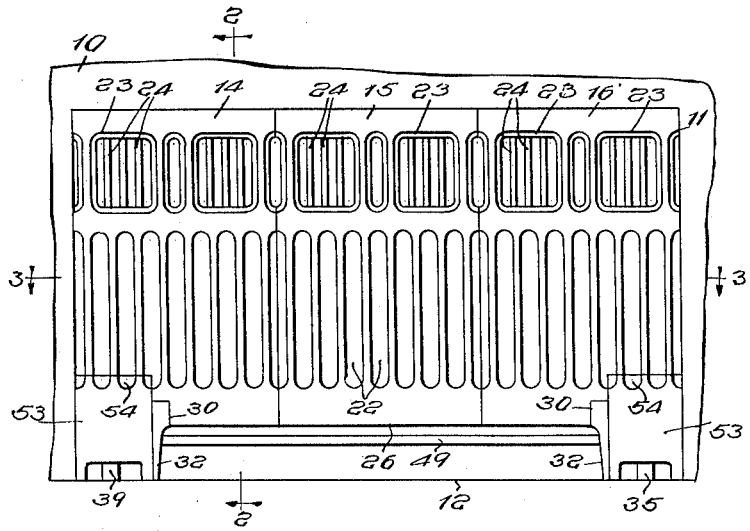
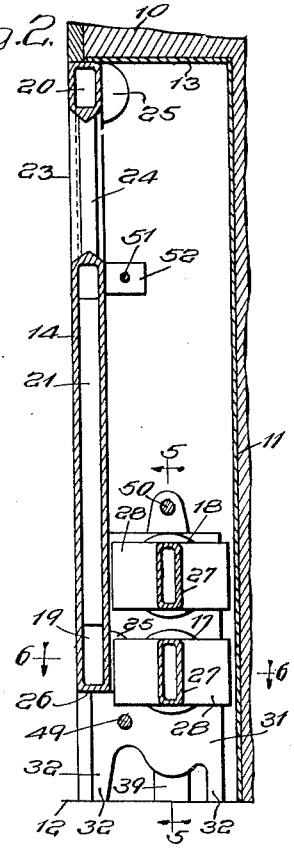
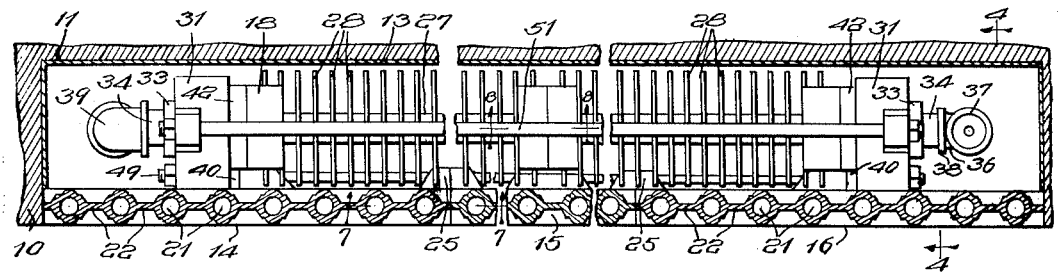
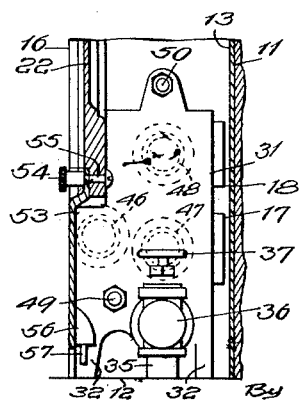
Inventor:
Harry G. Naylor Dec. 5, 1933.  H. G. NAYLOR  1,937,774
AIR HEATING APPARATUS
Original Filed May 1, 1931  2 Sheets-Sheet 2
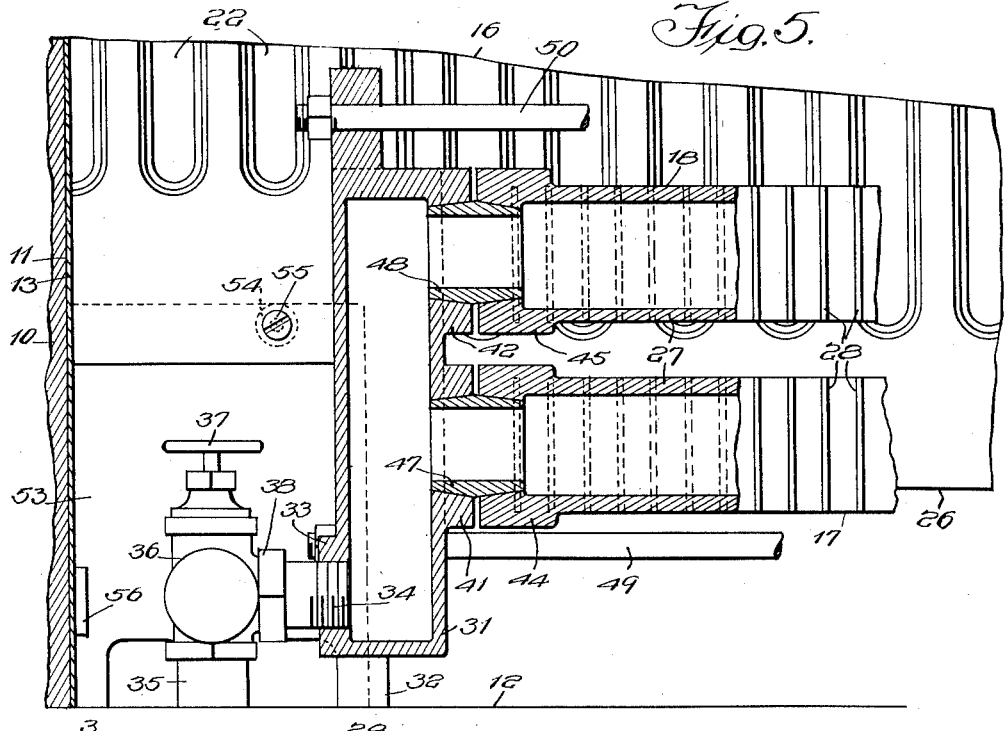
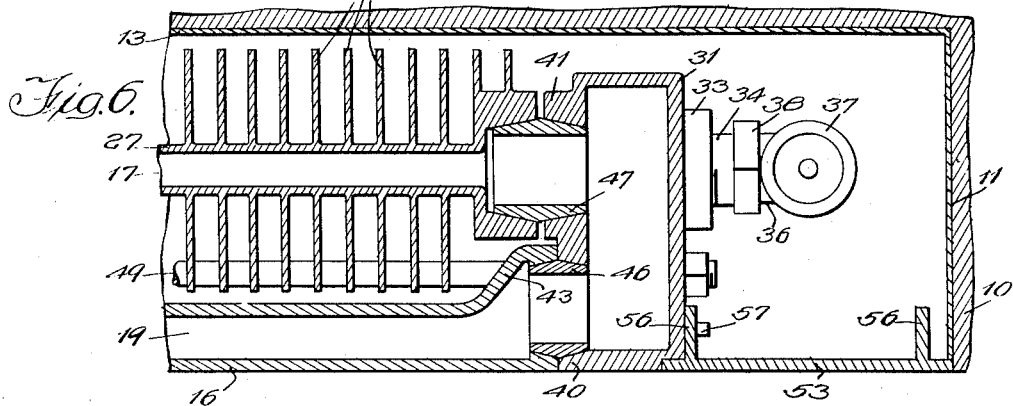
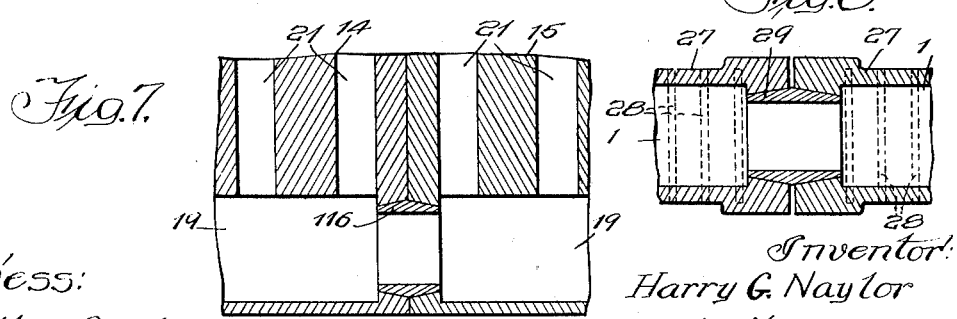
Inventor:
Harry G. Naylor
Joseph Harris
His Atty
Witness:
William P. Kilroy Patented Dec. 5, 1933

1,937,774

UNITED STATES PATENT OFFICE 1,937,774

AIR HEATING APPARATUS

Harry G. Naylor, Erie, Pa., assignor to Weil-McLain Company, Michigan City, Ind., a corporation of Delaware Application May 1, 1931, Serial No. 534,284
Renewed May 25, 1933

23 Claims. (Cl. 257—136)

This invention relates to improvements in air heating apparatus, and more particularly radiator arrangements.

In the development of radiator heating systems for homes, office buildings and the like, the trend of late years has been more and more toward placing the radiating elements in recesses in the walls in order to get away from the unsightly, fully exposed radiators. Heretofore, in such wall recessed radiators, the installations have been unsatisfactory, difficult to connect up with the supply and return pipes and inefficient, particularly on account of the loss of space necessitated by the pipe connections and valves which must be accessible. Prior to my present invention, so far as I am aware, either one of two schemes has always been employed to connect such recessed radiators with the pipes and to accommodate the control valve. One of said schemes necessitates providing a wall recess so elongated with reference to the over-all length of the radiator that spaces are provided at the ends of the radiator sections for the supply and return pipes to come up out of the floor and from the latter run connecting nipples inwardly to the ends of the radiators. The other of the schemes heretofore employed is to support the radiator section or sections sufficiently high above the floor so as to permit the piping to come up through the floor beneath the sections and from said piping run laterally outwardly toward the ends of the wall recess, the connecting nipples with included valve. In both of the schemes heretofore used as outlined above, it is evident that, for a given size wall recess, a considerable portion or space is not utilized and is thereby wasted since it might otherwise be occupied by heating surfaces. Stated otherwise, the former schemes, for a radiator unit or assembly of given capacity, have necessitated wall recesses which must be made excessively large and the excess space or area covered by grilles, or equivalent, which adds to the cost without rendering any resulting benefits and detracting from the appearance of the installation.

One object of my invention is to provide a radiator arrangement especially adapted for wall recess installation such that the valves and pipe connections therefor do not entail any waste space in the wall recess, either at the ends or beneath the radiator sections.

Another object of my invention is to provide a compact radiator arrangement such that the valve and pipe connections are located substantially within the area defined by the side and bottom lines of the radiator or within the outlines of a rectangular recess made to regular lines.

A further object of my invention is to provide an esthetically attractive radiator arrangement more especially adapted for installation in a wall recess such that the radiator panels or sections occupy substantially the entire opening of the wall recess, without the necessity of using any grille or false wall, while at the same time having the pipes and valve or valves readily accessible, although normally concealed.

Still another object of my invention is to provide a radiator arrangement combining an attractive radiator section or sections proper which are visible with heating unit or units of fin type, providing a more rapid heating of the air by currents passing between the fins with a flue effect produced by the radiator sections proper, the arrangement being further characterized by the fact that the necessary pipes and valve or valves are confined within the outlines of the radiator sections so as to occupy a minimum space and present an attractive appearance.

A specific object of my invention is to provide a radiator arrangement of the type hereinbefore indicated wherein combined supports and pipe header or distributor blocks are employed in connection with the heating units for making the water, steam or vapor connections therewith, which blocks are so arranged as to allow of the maximum surface area of the heating units to be presented to the air to be heated and without requiring excessive floor or wall space.

Other objects of my invention will more clearly appear from the description and claims hereinafter following, considered in connection with the drawings.

In the drawings forming a part of this specification, Figure 1 is an elevational view of a portion of a wall showing my improved heating arrangement associated therewith within a recess thereof. Figure 2 is a vertical, sectional view upon an enlarged scale, corresponding to the line 2—2 of Figure 1. Figure 3 is an enlarged, horizontal, sectional view corresponding to the line 3—3 of Figure 1, parts being broken out to better accommodate the view on the sheet. Figure 4 is a vertical, detailed, sectional view corresponding to the line 4—4 of Figure 3. Figure 5 is an enlarged, detailed, vertical, sectional view corresponding to the line 5—5 of Figure 2. Figure 6 is an enlarged, horizontal, sectional view corresponding to the line 6—6 of Figure 2. Figure 7 is a detailed, sectional view corresponding to the line 7—7 of Figure 3. And Figure 8 is a detailed, vertical, sectional view corresponding to the line 8—8 of Figure 3.

In said drawings, a portion of a room wall is indicated at 10, the same being formed with a rectangular recess 11 therein defined on the sides, back and top by the wall and at the bottom by the floor 12. Said recess is preferably lined with a sheet metal casing 13 fitting against the side or end walls, back wall and top wall, as clearly shown.

In the particular embodiment of my improvements illustrated in the drawings, I employ three radiator sections or panels 14, 15 and 16 and two heating units of the fin type referenced 17 and 18, together with certain other features hereinafter described.

The radiator sections or panels proper 14, 15 and 16 are disposed within the recess 11 flush with the outer wall surface, as shown in Figure 2, and the combined over-all length of said sections (the number of which may obviously be varied in accordance with different heating conditions) will correspond to the length of the wall recess 11 so that said sections will fit snugly therein, as best indicated in Figure 3. Said radiator sections will preferably be made of attractive grille-like formation, each section having a lower horizontal header 19, top header 20 and a plurality of vertically extending hollow tubes 21 therebetween, said tubes 21 being connected by webs 22 for the greater part of their length. At the top portions of the radiator sections, grille-like openings 23—23 are formed, the grille effect thereof being obtained by introducing a plurality of vertically disposed bars 24—24. As will be evident, particularly from inspection of Figure 3, the sections 14, 15 and 16 are relatively thin in a direction transverse to the wall and are arranged end to end and communication between adjacent sections is obtained by suitable push nipples 116 at the top and bottom headers, which nipples are accommodated in lateral offsets 25 on the inner or unexposed sides of the panels. It will be observed from Figure 1 that said sections or panels 14, 15 and 16 are of such a height as to reach to the top of the wall recess, any separate grille or vent being rendered unnecessary on account of the vent or grille openings 23 above referred to. It will further be seen from inspection of Figure 1 that the bottom edges of said sections 14, 15 and 16, as indicated at 26, are disposed relatively near the floor line, some spacing above the floor being necessary in order to provide an entrance passage for the air which circulates through the fin units 17—18 and upwardly behind the radiator sections, as will be obvious.

The fin heating units 17 and 18 may be of any suitable type, those shown each comprising a core 27 having cast integrally therewith a plurality of laterally extended fins 28—28. The number of fin units may be varied in accordance with different conditions, the drawings illustrating four such units, two arranged end to end at one level and two others similarly arranged at a higher level. Where the units are arranged end to end, connection for the heating medium is established by suitable nipples 29, as shown in detail in Figure 8. The end connections of the several heating elements are described hereinafter.

In carrying out my invention, the two end radiator sections or panels 14 and 16 are specially formed, each having its lower outer corner recessed or cut back, as indicated at 30—30 in Figure 1, such cut out corners, as will be evident, rendering the lower headers 19 of said sections of lesser length than the over-all length or width of the remaining tube and upper header portions, that is, the end portion of the lower header is inset with reference to the vertical end planes of the sections 14 and 16, for the purpose hereinafter described.

At each end of the heating assembly, I provide a special block 31 which combines several purposes or functions. Each said block is of generally rectangular outline with a pair of depending, transversely spaced supporting legs 32—32. Said blocks are adapted to fit within the corner recesses of the end radiator sections 14 and 16, as shown in the drawings, and when in position, support the entire radiator assembly. Each of said blocks is formed on its outer side, that is the end nearest the corresponding end of the wall recess, with a boss 33 for a nipple connection 34, the supply line being illustrated in detail in Figures 4, 5 and 6. In said figures, the supply pipe coming vertically upward through the floor is indicated at 35, the same having a control valve 36 applied thereto, the valve handle being indicated at 37, and so disposed that it is at a level below the overhanging portion of the radiator section 16. Communication between the valve and the nipple 34 may be made by a union 38. The heating medium employed may be hot water, steam or vapor, as will be understood, the supply coming through the pipe 35, as above indicated, and the return being through the pipe 39 at the opposite end.

On its inner side, that is the side next adjacent the corresponding radiator sections 14 or 16, each block or header or distributor 31 will be provided with bosses 40, 41 and 42 disposed opposite the respective nipple ends 43 of the radiator sections and 44 and 45 of the lower and upper lines of fin units, whereby communication for the hot water or other heating medium is established by nipples 46, 47 and 48, respectively.

The radiator sections or panels, fin units and blocks 31, when assembled as shown in the drawings, are adapted to be all held together by suitable tie rods 49, 50 and 51, the rods 49 and 50 being extended from one block 31 to the other and the rod 51 being extended between end lugs 52 on the end radiator sections 14 and 16.

The cut out lower corners of the radiator sections are adapted to be normally closed or covered by suitable detachable plates 53, which are received flush with the outer surfaces of the blocks 31 of the radiator sections, each of said plates 53 being preferably held in place by a knurled nut 54 and stove bolt 55. The plates 53 may be centered by suitable lugs 56 on the inner sides thereof, which engage with lugs 57 cast on the blocks 31. By removing the right-hand end plate 53, which may be done by merely turning off the nut 54, access may be had to the control valve 36—37 and the supply of heat regulated, as will be evident. It is further obvious that access may be had at any time to either the supply or return pipe connections and that there is ample space for manipulating wrenches or the like for connecting up when the assembly is inserted within the wall recess, thus greatly facilitating the installation, as will be apparent.

It will further be observed, particularly from inspection of Figure 1, that there is no waste space in the wall recess, the entire area of the latter being occupied by the radiator sections or panels, except for the small space at the bottom which is necessary to permit entrance of air to pass around the fin units and up behind the radiator panels. All piping and valves are confined within the end planes of the radiator panels so that, for a given wall space, a maximum heating surface is available or, stated otherwise, for a heating assembly of given capacity, a minimum sized wall recess is required. Further, my improved arrangement does away entirely with any false walls, such as heretofore commonly employed and no separate grilles or the like are required to conceal the heating elements proper.

By employing a combination of radiator sections or panels such as shown at 14, 15 and 16, with fin units such as shown at 17 and 18, a well balanced and efficient heating of the air is obtained. Passage of the air between the fins of the fin units permits of rapid heating thereof, the current of air passing along the flue-like arrangement formed by the outer radiator panels and back wall of the recess and passing out at the top through the grille-like openings 23. Due to the greater volume of water which is contained within the radiator sections 14, 15 and 16, a slower or more gradual cooling takes place whenever the supply of heating medium is shut off, thus combining the advantages of rapid heat when desired as obtained from the fin units and more prolonged or sustained heat from the radiator sections or panels.

I have herein shown and described what I now consider the preferred manner of carrying out the invention, but as will be obvious to those skilled in the art, many changes and variations may be made within the scope of the invention and all such changes and variations are contemplated as come within the scope of the appended claims.

I claim:

1. In an air heating arrangement adapted to be disposed in a wall recess, the combination with a radiator of an over-all length substantially equal to that of the recess to fit therewithin and cut away at one of its lower corners; of a supply pipe connection to said radiator, said connection being disposed within the elevational outlines of said cut away corner and inside the vertical plane of the end of the radiator.

2. In an air heating arrangement adapted to be disposed in a wall recess, the combination with a radiator of an over-all length corresponding to that of the recess and adapted to fit therewithin, said radiator being cut away at each of its lower corners; and supply and return pipe connections with the radiator, said connections being disposed within the elevational outlines of said cut away corners and located inside of the vertical end planes of the radiator.

3. As an article of manufacture, a radiator section including bottom and top headers and a plurality of connecting tubes therebetween, the bottom header being of lesser length than the overall, horizontal width of the tubes and having its outer end terminating inwardly of the vertical plane of the outer end tube, said end having an opening therein facing toward the end of the section whereby a pipe connection may be made with said section through said opening above the bottom line of the section and within the end plane thereof.

4. In an apparatus of the character described, the combination with a radiator section cut out at one of its lower corners; of a combined leg support and header block fitted within said corner and having communication with said section for the heating medium.

5. In an arrangement of the character described, the combination with a radiator panel including two end sections each being cut out at its lower outer corner; of a combined leg support and header block fitted within each of said recess corner portions of the sections and having communication with the corresponding sections.

6. In an air heating arrangement adapted for installation in a wall recess, the combination with a plurality of relatively thin tubular radiator sections, disposed end to end and of a total over-all length to occupy the full length of the recess and provide a grille-like closure therefor; of means for supplying a heating medium to said sections at one end thereof, said means including a connection with the end section located above the bottom line of the sections and inside of the end plane of the end section.

7. In a heating arrangement of the character described, the combination with a heating unit having fins providing a relatively large surface area for heating a current of air; of another higher, relatively thin radiating unit so disposed that air currents passing up through the fin unit then pass up along the adjacent side of said higher unit; and means for supplying a heating medium to both of said units including a hollow block disposed at the lower outer corners of said units and inside of the vertical end plane of said higher unit.

8. In a heating arrangement of the character described, the combination with a fin heating unit; of a radiator unit disposed adjacent thereto; and hollow supporting blocks at each end of said units, each of said blocks having connection for the heating medium with said units, said blocks being disposed within the end planes of the radiator units.

9. In a heating arrangement adapted to be disposed in a wall recess, the combination with an outer grille-like radiator panel fitted within the recess and of a length corresponding to the length of the recess and having its lower end spaced a short distance above the floor line; of a fin type heating unit disposed behind the radiator panel within the recess; and means providing connections between the supply and return pipes and the respective ends of the panel and fin units, each of said means including a hollow block disposed within the end planes of the radiator panel, said blocks having nipple connections with the radiator and fin units at points above the bottom line of the radiator panel.

10. In an air heating arrangement adapted to be disposed within a wall recess, the combination with a plurality of tubular radiator sections arranged end to end and forming a grille-like closure for the recess and of a total over-all length substantially equal to that of the recess; of a plurality of fin heating units arranged end to end and disposed behind the radiator sections within the recess; detachable header blocks at each end of the assembled radiator sections and fin units, each of said blocks having nipple connections with the corresponding adjacent end elements of the radiator sections and fin units, said blocks being disposed within the recess; and feed and return pipes connecting with said blocks and having their upper ends also disposed within said recess.

11. In a radiator, the combination with a plurality of radiator sections disposed end to end, the lower end corner portions of said sections being cut away to provide corner recesses; of a combined leg support and header block fitter within each of said corners and having communication with the radiator sections; and detachable cover plates for each of said recessed corners.

12. In an air heating apparatus for a wall recess, the combination with a plurality of tubular radiator sections arranged end to end and adapted to be disposed within the recess to form a grille-like closure therefor; of means for supporting said assembled sections above the floor line, said means including a detachable combined leg support and hollow block at each end of the assembled sections, the outer faces of said blocks being disposed inwardly of the vertical end planes of the assembled sections; and pipe connections with said blocks disposed on the outer sides thereof and also located within the vertical end planes of the assembled sections.

13. In an air heating apparatus for a wall recess, the combination with a plurality of tubular radiator sections arranged end to end and adapted to be disposed within the recess to form a grille-like closure therefor; of means for supporting said assembled sections above the floor line, said means including a detachable combined leg support and hollow block at each end of the assembled sections, the outer faces of said blocks being disposed inwardly of the vertical end planes of the assembled sections; pipe connections with said blocks disposed on the outer sides thereof and also located within the vertical end planes of the assembled sections; and a plurality of fin heating units disposed behind the assembled radiator sections, said units being also in communication with said blocks and supported thereby.

14. As an article of manufacture, a radiator having top and bottom longitudinally extending headers, said bottom header being cut away to provide an accessible recess located within the elevational area defined by the end and bottom planes of the radiator, one of the walls of said recess having an opening therein communicating with said header, whereby a connection to the radiator for the supply of the heating medium may be made within said area.

15. In a device of the character described, the combination with a radiator proper having a bottom header, the latter being cut out to provide an accessible recess located within the area defined by the end and bottom planes of the radiator; of a header block disposed and fitted within said recess and having communication with the header, said block being adapted for connection to a source of supply of the heating medium, whereby the connection for the heating medium to said radiator may be made within the area defined by said end and bottom planes.

16. As an article of manufacture, a radiator having a bottom header, said header being cut away to provide an accessible recess located within the area defined by the end and bottom planes of the radiator, one of the walls of said recess having an opening therein communicating with said header, whereby a connection to the radiator for the supply of the heating medium may be made within said area; and a detachable cover plate conforming to said recess and adapted to conceal the connection.

17. A radiator formed with a recess lying within the elevational area outlined by the horizontally disposed planes of the top and bottom and vertically disposed planes of the ends of the radiator, one of the walls defining said recess extending vertically and having an opening therethrough communicating with the interior of the radiator, whereby an accessible, horizontally disposed connection to the radiator for a supply of the heating medium may be made within said recess and within the outlines of the radiator.

18. A radiator formed with a recess lying within the elevational area outlined by the planes of the top, bottom and ends of the radiator, one of the walls defining said recess having an opening therethrough communicating with the interior of the radiator, whereby an accessible connection to the radiator for a supply of the heating medium may be made within said recess and within the outlines of the radiator; and a removable cover plate for said recess adapted to conceal such connection.

19. In an air heating apparatus adapted to be used in a wall recess, the combination with a radiator having top and bottom horizontally extending headers connected by a plurality of vertically arranged spaced tubes to thereby form a grille-like closure, said radiator being relatively thin in a direction transverse to the wall and of an over-all length substantially equal to the length of the wall recess to fit therewithin; of a heating medium supply pipe connection to said radiator, the connection between said pipe and the radiator being disposed inwardly of the ends of the radiator and wall recess.

20. In an air heating apparatus adapted for installation in a wall recess, the combination of a tubular type radiator of an over-all length substantially equal to that of the wall recess to fit therewithin; of a heating medium supply pipe connected to said radiator, said supply pipe having a control valve included therein, said control valve and the connection between said pipe and radiator being disposed inwardly of the ends of the radiator and wall recess and accessible from the front of the radiator; and a cover plate detachably connected to the radiator in front of said pipe and valve for normally concealing the latter.

21. As an article of manufacture, a radiator section comprising top and bottom headers and a plurality of connecting and communicating vertically extending tubes therebetween, one end of said bottom header terminating an appreciable distance inwardly of the vertical plane defined by the vertical end tube at the corresponding end of the radiator section, said end of the bottom header being provided with an opening facing toward the corresponding end of the section whereby to provide a connection for the heating medium with said bottom header.

22. In an air heating apparatus of the character described, the combination with a radiator section including a horizontally extending bottom header, the latter having an end terminating inwardly of the vertical plane defined by the corresponding end of the section proper; of a combined leg support and header block, a portion of which overlaps said end of the bottom header; and means providing communication for the heating medium between the overlapped portions of said bottom header end and header block.

23. In an air heating arrangement of the character described, the combination with a heating unit having fins providing a relatively large surface area for heating a current of air; of another higher, grille-like relatively thin radiating unit disposed adjacent said heating unit, the air currents passing up between the fins of the heating unit passing up alongside the adjacent side of said higher unit, one end of said heating unit terminating inwardly of the vertical plane defined by the corresponding adjacent end of the radiating unit, said heating unit end having a nipple opening therein and the radiating unit having also a nipple opening located inwardly of said end plane; and a hollow block positioned opposite and adjacent said nipple openings and having nipple connections with said heating unit and radiating unit.

HARRY G. NAYLOR.